US012044004B2

(12) United States Patent
Holder

(10) Patent No.: US 12,044,004 B2
(45) Date of Patent: Jul. 23, 2024

(54) FIRE DAMPER

(71) Applicant: Price Holyoake (NZ) Limited, Auckland (NZ)

(72) Inventor: Gary Brian Holder, Auckland (NZ)

(73) Assignee: Price Holyoake (NZ) Limited, Aukland (NZ)

( * ) Notice: Subject to any disclaimer, the term of this patent is extended or adjusted under 35 U.S.C. 154(b) by 723 days.

(21) Appl. No.: 17/149,336

(22) Filed: Jan. 14, 2021

(65) Prior Publication Data

US 2021/0222425 A1 Jul. 22, 2021

(30) Foreign Application Priority Data

Jan. 17, 2020 (NZ) ........................................ 760912

(51) Int. Cl.
*E04B 1/94* (2006.01)
*A62C 2/16* (2006.01)

(52) U.S. Cl.
CPC ................ *E04B 1/947* (2013.01); *A62C 2/16* (2013.01); *E04B 1/948* (2013.01)

(58) Field of Classification Search
CPC . E06B 1/947; E06B 1/948; A62C 2/16; E04F 10/10
See application file for complete search history.

(56) References Cited

U.S. PATENT DOCUMENTS 3,017,899 A * 1/1962 Goldsmith .............. E06B 7/084 251/285
3,123,098 A * 3/1964 Bishop .................... F24F 13/15 137/527
3,312,159 A * 4/1967 Shepherd ................ A62C 2/16 137/72
3,538,975 A * 11/1970 Tarnoff .................... A62C 2/16 160/1
3,620,242 A * 11/1971 Pease ........................ F16K 1/16 137/240
3,861,443 A * 1/1975 Tarnoff .................... A62C 2/16 160/84.01
3,866,657 A * 2/1975 McCabe .................. A62C 2/16 160/181

(Continued)

FOREIGN PATENT DOCUMENTS

AU 2015201058 B2 12/2015
AU 2018264037 A1 7/2019

(Continued)

*Primary Examiner* — Beth A Stephan
(74) *Attorney, Agent, or Firm* — Knobbe, Martens, Olson and Bear, LLP

(57) ABSTRACT

A fire damper including a frame and a plurality of blades rotatably mounted to the frame such that each blade is rotatable about a respective rotational axis between an open rotational position and a closed rotational position, each blade including at least one substantially planar portion; and a side edge portion which is curved away from a plane of the substantially planar portion, wherein a first curved side edge portion of a first of the blades is adapted to engage a second curved side edge portion of a second of the blades, adjacent the first, when the blades are in the closed position; and wherein the first curved side edge portion curves in an opposite direction to the second curved side edge portion when the first and second blades are engaged.

18 Claims, 23 Drawing Sheets

(56) References Cited

U.S. PATENT DOCUMENTS

| | | | | | |
|---|---|---|---|---|---|
| 3,908,529 | A * | 9/1975 | McCabe | F24F 13/15 | 454/352 |
| 4,080,978 | A * | 3/1978 | McCabe | A62C 2/14 | 137/79 |
| 4,185,657 | A * | 1/1980 | McCabe | E06B 7/084 | 251/305 |
| 4,185,658 | A * | 1/1980 | McCabe | A62C 2/14 | 251/305 |
| 4,193,605 | A * | 3/1980 | Josephson | F24F 13/15 | 277/642 |
| 4,219,041 | A * | 8/1980 | McCabe | A62C 2/245 | 160/1 |
| 4,219,185 | A * | 8/1980 | McCabe | F24F 13/15 | 251/308 |
| 4,277,870 | A * | 7/1981 | McCabe | F24F 13/15 | 29/434 |
| 4,333,392 | A * | 6/1982 | Nailor | A62C 2/16 | 160/1 |
| 4,372,485 | A * | 2/1983 | McCabe | F23L 13/02 | 236/1 G |
| 4,390,123 | A * | 6/1983 | McCabe | G05D 23/08 | 110/163 |
| 4,442,862 | A * | 4/1984 | McCabe | F24F 13/15 | 251/280 |
| 4,763,711 | A * | 8/1988 | Hart | A62C 2/16 | 160/1 |
| 4,887,641 | A * | 12/1989 | Alley | F24F 13/15 | 251/118 |
| 5,060,557 | A * | 10/1991 | Dunn | F24F 13/15 | 454/369 |
| 5,217,407 | A * | 6/1993 | Bailey | F24F 13/10 | 160/1 |
| 5,238,453 | A * | 8/1993 | Heil | F24F 13/15 | 137/601.09 |
| 5,810,662 | A * | 9/1998 | Van Becelaere | A62C 2/14 | 454/284 |
| 6,019,679 | A | 2/2000 | Lloyd | | |
| 6,349,505 | B1 * | 2/2002 | Figge | E06B 5/12 | 49/64 |
| 6,557,583 | B2 * | 5/2003 | McCabe | A62C 2/247 | 74/89.38 |
| 8,881,455 | B2 * | 11/2014 | Ro | E04F 10/10 | 49/7 |
| 10,222,089 | B2 * | 3/2019 | Chappell | F24F 13/1406 | |
| 2010/0089468 | A1 * | 4/2010 | Scott | F23R 3/06 | 137/468 |
| 2014/0008561 | A1 * | 1/2014 | Enke | F24F 13/1413 | 251/306 |
| 2016/0216000 | A1 * | 7/2016 | Monahan | F24F 13/1413 | |
| 2017/0097170 | A1 * | 4/2017 | Pichai | F24F 11/76 | |

FOREIGN PATENT DOCUMENTS

| | | | |
|---|---|---|---|
| CN | 105422942 | A | 3/2016 |
| EP | 0583156 | A1 | 2/1994 |

* cited by examiner

FIRE DAMPER

TECHNICAL FIELD

The present invention relates to a fire damper for impeding the spread of fire and smoke through a cavity in a wall or floor which has been formed for air flow, in particular HVAC air flow.

BACKGROUND ART

Combination smoke and fire dampers, for simplicity referred to herein as "fire dampers", are used in buildings to aid in preventing the spread of fire and smoke in the event of a fire in the building. Fire dampers are a form of passive fire protection and are usually associated with an air distribution system, for example an air conditioning system. Walls, partitions or floors are adapted to include ducts, holes, or passageways to allow air to flow through. These are required to be equipped with a fire damper that meets the fire rating standard set by a relevant building code. The damper may be required to have an integrity rating equal or greater than that of the separating element or fire barrier that it penetrates. The damper is usually designed to shut or block the passage during a fire in order to prevent the spread of smoke and/or fire.

Fire dampers may be configured to impede the spread of fire and heat within building compartments whilst maintaining the integrity of the building element (most commonly a wall) through which the damper passes in use.

Fire dampers may comprise one or more blades that are configured to rotate to a closed configuration during a fire to prevent the spread of fire and/or smoke. When shut, the blades must not lock together as they need to have the ability to open again after the damper has closed. During a fire, the fire damper must prevent significant leakage of air between the two cavities on either side of the damper. However, the blades of some fire dampers may bend during a fire and cause gaps that will lead to an increase in leakage. The fire dampers of the prior art may therefore not meet future, more stringent, regulatory standards.

It is an object of the present invention to provide a fire damper for impeding the spread of fire and/or smoke in a building that addresses at least one of the aforementioned needs/problems.

It is an alternative object of the present invention to at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Further aspects and advantages of the present invention will become apparent from the ensuing description which is given by way of example only.

DISCLOSURE OF THE INVENTION

In various forms of the technology there is provided a fire damper comprising a frame and a plurality of blades rotatably mounted to the frame such that each blade is rotatable about a respective rotational axis between an open rotational position and a closed rotational position, each blade comprising at least one substantially planar portion and a side edge portion which is curved away from a plane of the substantially planar portion, wherein a first curved side edge portion of a first of the blades is adapted to engage a second curved side edge portion of a second of the blades, adjacent the first, when the blades are in the closed position, wherein the first curved side edge portion curves in an opposite direction to the second curved side edge portion when the first and second blades are engaged.

According to a first aspect of the invention there is provided a fire damper comprising a frame and a plurality of blades rotatably mounted to the frame such that each blade is rotatable about a respective rotational axis between an open rotational position and a closed rotational position, each blade comprising at least one substantially planar portion and a side edge portion which is curved away from a plane of the substantially planar portion, wherein a first curved side edge portion of a first of the blades is adapted to engage a second curved side edge portion of a second of the blades, adjacent the first, when the blades are in the closed position, wherein the first curved side edge portion curves in an opposite direction to the second curved side edge portion when the first and second blades are engaged, and wherein, in transverse cross section, each of the first and second side edge portions form a curve having a central angle of between 180° and 200°.

Preferably the curve is an arc.

Preferably the central angle is substantially 194°.

Preferably each curved side edge portion comprises a partial surface of revolution.

Preferably the axis of rotation of the centre of revolution is parallel to the rotational axis of the blade.

Preferably a ratio of the radius of the arc and the distance between the rotational axis of the blade and boundary between the planar portion and the side edge portion is substantially 1:12.

Preferably, the first blade is provided with a resiliently flexible sealing member adapted to abut a surface of the second blade when the blades are in the closed rotational position.

Preferably the angle of rotation between the open rotational position and the closed rotational position of the blades is at least 100°.

Preferably, the angle of rotation is between 100° and 120°.

Preferably, the angle of rotation is 111°.

Preferably, the first blade is provided with a bimetallic strip configured to bend and overlap both the first and second blades when the blades are in the closed rotational position.

According to a second aspect of the invention there is provided a fire damper comprising a frame and a plurality of blades rotatably mounted to the frame such that each blade is rotatable between an open rotational position and a closed rotational position, each blade comprising at least one substantially planar portion and a side edge portion which is curved away from a plane of the substantially planar portion, wherein a first curved side edge portion of a first of the blades is adapted to engage a second curved side edge portion of a second of the blades adjacent the first when the blades are in the closed position, wherein the first curved side edge portion curves in an opposite direction to the second curved side edge portion when the first and second blades are engaged, wherein the first blade is provided with a resiliently flexible sealing member adapted to abut a surface of the second blade when the blades are in the closed rotational position.

Preferably, the sealing member is biased towards a rest position.

Preferably, the sealing member is deflected from the rest position to a sealing position when contacted by the second blade.

Preferably, the sealing member forms a smaller angle with respect to the planar portion of the first blade when in the sealing position than when in the rest position.

Preferably, the sealing member is attached to the first blade near a side edge of the blade.

Preferably, the sealing member is configured to contact the second curved side edge portion of the second blade when the blades are in the closed rotational position.

Preferably, the sealing member is formed from stainless steel.

Preferably, a layer covers the sealing member and is spot welded to the first blade.

According to a third aspect of the invention there is provided a fire damper comprising a frame and a plurality of blades rotatably mounted to the frame such that each blade is rotatable about a respective rotational axis between an open rotational position and a closed rotational position, each blade comprising a substantially planar portion and a side edge portion which is curved away from a plane of the substantially planar portion, wherein a first curved side edge portion of a first of the blades is adapted to engage a second curved side edge portion of a second of the blades adjacent the first when the blades are in the closed position, and wherein for at least one of the first and second blades the angle of rotation between the open rotational position and the closed rotational position is at least 100°.

Preferably, the angle of rotation is between 100° and 120°.

Preferably, the angle of rotation is 111°.

Preferably, the fire damper comprises a linkage system to convert a 90° rotation of a motor to the desired rotation of the blade.

According to a fourth aspect of the invention, there is provided a fire damper comprising a frame, the frame comprising a pair of opposed first sides and a pair of opposed second sides, the fire damper further comprising a plurality of blades rotatably mounted to the first sides of the frame and rotatable between an open rotational position and a closed rotational position, wherein the fire damper further comprises a sealing means provided on at least one of the sides of the frame, the sealing means comprising:

an intumescent material provided on an inner surface of the frame; and a cover provided over the intumescent material, wherein at least a part of the cover is configured to move towards the centre of the fire damper when the intumescent material expands.

According to a fifth aspect of the invention, there is provided a fire damper comprising a frame, the frame comprising a pair of opposed first sides and a pair of opposed second sides, the fire damper further comprising a plurality of blades rotatably mounted to the first sides of the frame and rotatable between an open rotational position and a closed rotational position, wherein the fire damper further comprises a sealing means provided on at least one of the first sides of the frame, the sealing means comprising:

an intumescent material provided on an inner surface of the frame; and a cover provided over the intumescent material and configured to move towards the centre of the fire damper when the intumescent material expands.

Preferably, the cover is formed from stainless steel.

Preferably, the fire damper comprises a sealing means located on each of the first sides of the frame.

According to a sixth aspect of the invention, there is provided a fire damper comprising a frame, the frame comprising a pair of opposed first sides and a pair of opposed second sides, the fire damper further comprising a plurality of blades rotatably mounted to the first sides of the frame and rotatable between an open rotational position and a closed rotational position, wherein the fire damper comprises a sealing means provided on at least one of the second sides of the frame, the sealing means comprising:

an intumescent material provided on an inner surface of the frame; and a resilient flexible cover configured to fit over the intumescent material, wherein a first edge of the flexible cover is fixed relative to the frame and wherein a second edge of the flexible cover, opposite the first edge, moves towards the centre of the fire damper when the intumescent material expands.

Preferably, the first edge is closer to an inlet of the fire damper than the second edge.

Preferably, the cover is formed from stainless steel.

Preferably, when the intumescent material expands the flexible cover deforms to a position which assists in preventing the movement of an adjacent blade from the closed position to the open position.

Preferably, the sealing means forms a seal with a longitudinal edge of an adjacent blade.

Preferably, the fire damper comprises a second sealing means on the opposite side of the frame which forms a seal with a longitudinal edge of an adjacent blade.

Preferably, the fire damper comprises biasing means which bias the blades towards the closed rotational position.

Preferably the biasing means comprises at least one spring.

According to a further aspect of the invention there is provided a method of manufacturing a frame for a fire damper comprising:

i. Providing a strip of sheet metal;

ii. Removing material from at least one corner forming portion of the strip to form a generally trapezoidal aperture comprising a longer parallel side, a shorter parallel side and at least one first tab protruding from the shorter parallel side;

iii. Removing material from the strip on an opposite side of the trapezoidal aperture to the at least one first tab to form at least one first slot;

iv. Removing material from one end of the strip to define at least one second tab and removing material from the opposite end of the strip to form at least one second slot;

v. Forming the strip such that the strip has a profile comprising a substantially planar central portion, angled portions provided at each end of the central portion, and end flanges provided at ends of the angled portions distal to the central portion, wherein the end flanges are substantially coplanar and are substantially parallel to the central portion;

vi. Folding the strip at each of the corner forming portions such that the first tabs of each respective corner forming portion insert into the first slots of the respective corner forming portion; and vii. Engaging the at least one second tab with the at least one second slot.

Preferably, the at least one first tab and/or the at least one second tab is rectangular in shape.

Preferably, the slots are substantially U-shape.

Preferably, the U-shaped slots form a resilient flap portion which flexes to assist insertion of the tabs into the slots.

BRIEF DESCRIPTION OF DRAWINGS

Further aspects of the present invention will become apparent from the following description which is given by way of example only and with reference to the accompanying drawings in which.

BRIEF DESCRIPTION OF PREFERRED EMBODIMENTS OF THE INVENTION

Figure 1:
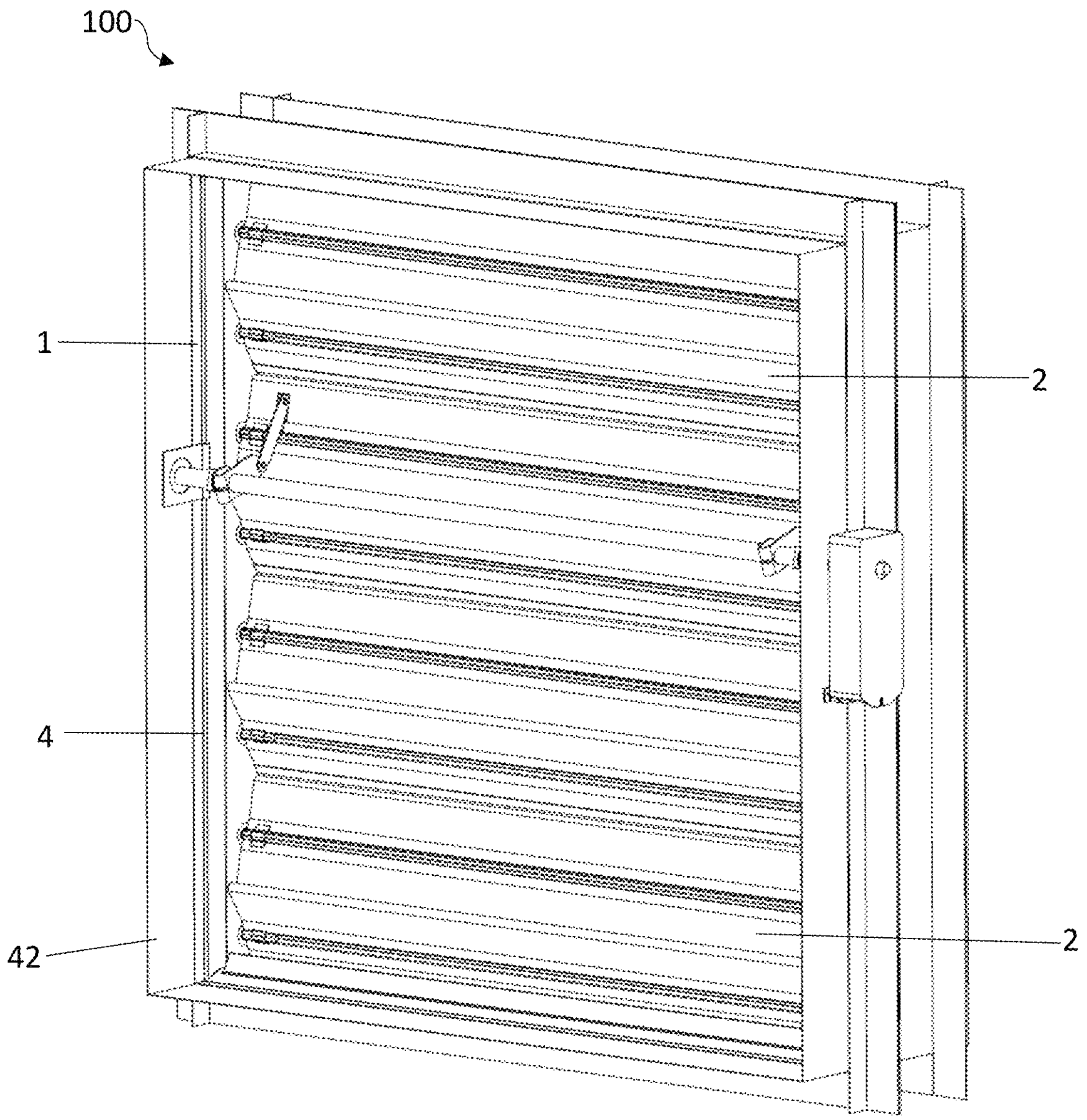
FIG. 1 shows a rear (outlet end) perspective view of a fire damper with blades in a closed rotational position according to an embodiment of the present invention.
Figure 2:
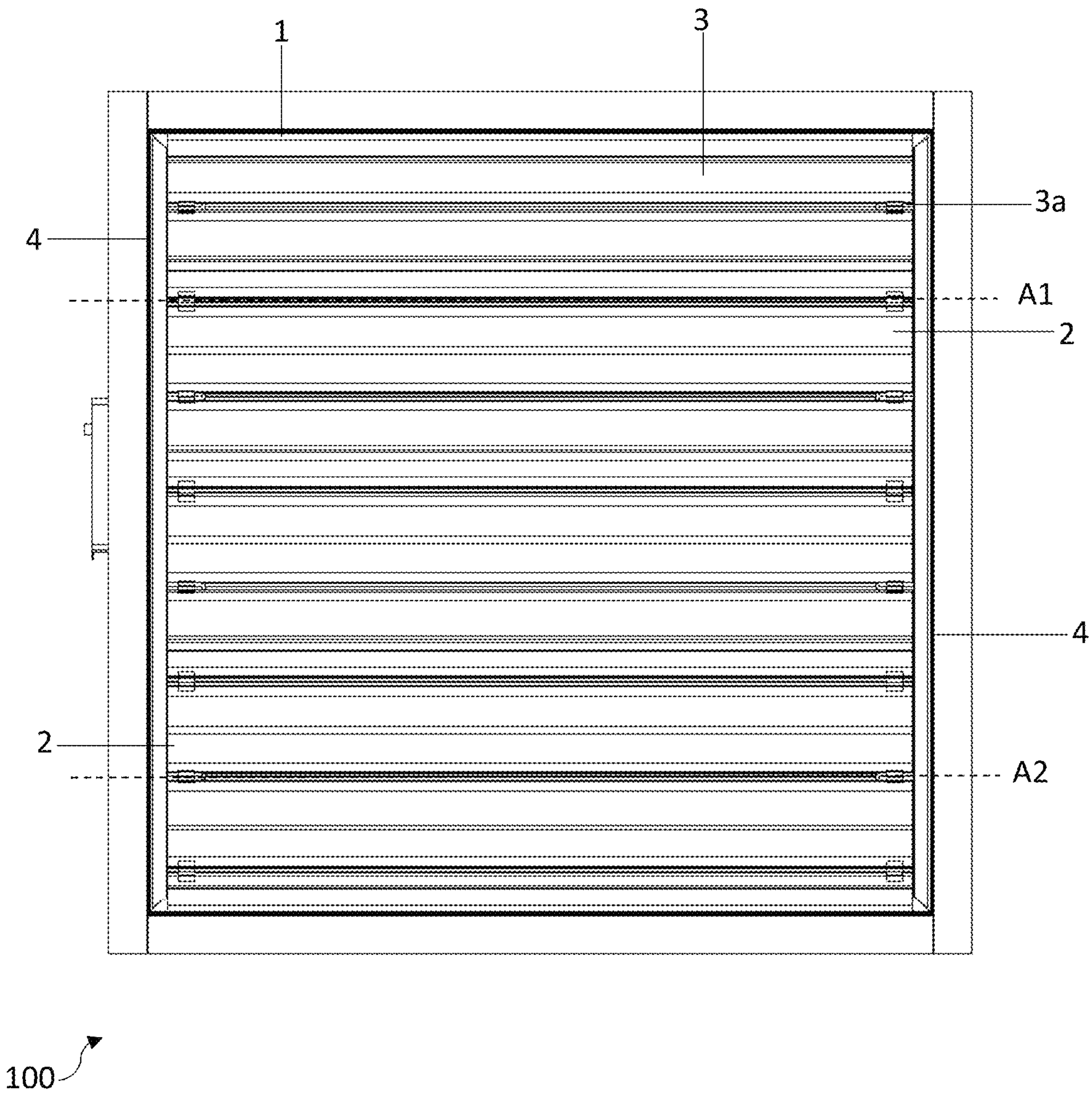
FIG. 2 shows a front (inlet end) view of the fire damper of FIG. 1.
Figure 3:
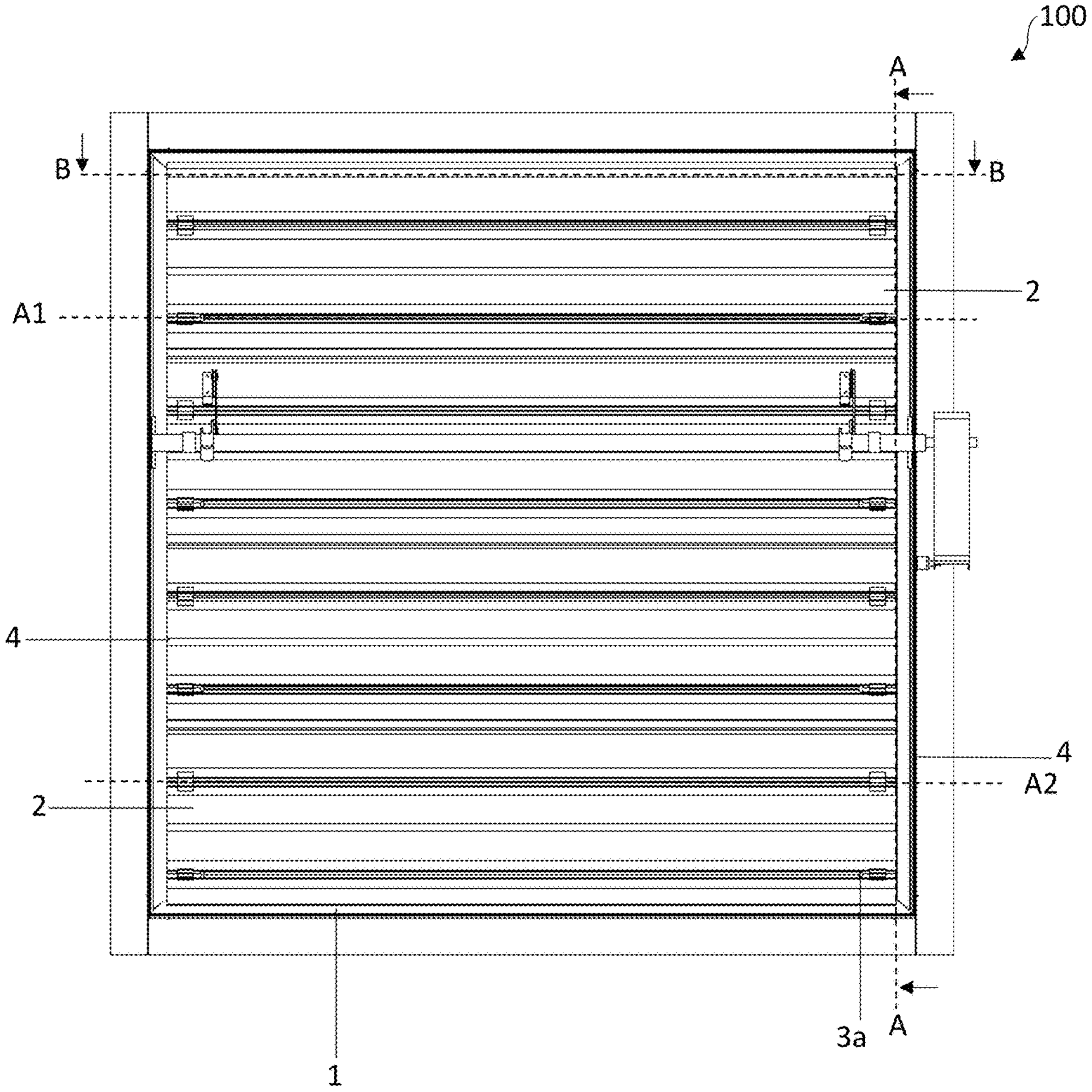
FIG. 3 shows a rear view of the fire damper of FIG. 1.
Figure 4:
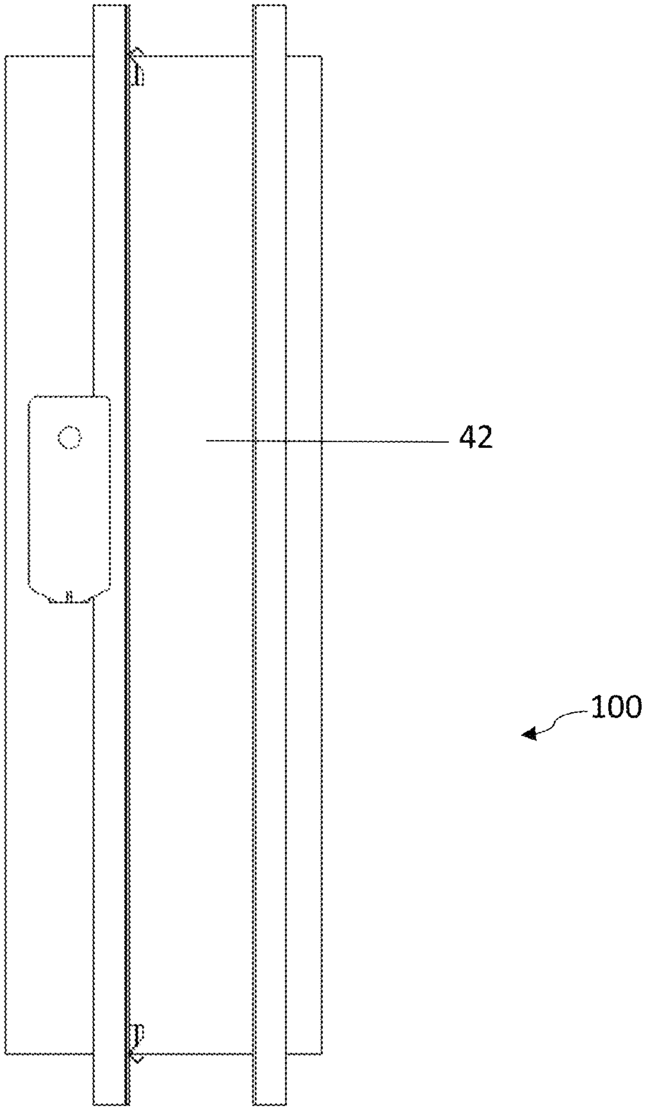
FIG. 4 shows a left side view of the fire damper of FIG. 1.

Referring first to FIGS. 1 to 12 a fire damper for preventing the spread of fire and smoke in an air distribution system is generally indicated by arrow 100. The term "fire damper" is used herein to include both smoke and fire dampers which act as forms of passive fire protection to assist in preventing the spread of smoke and fire within a building.

The fire damper 100 comprises a sleeve 42 which houses a frame 1. The fire damper 100 further comprises a plurality of blades 2, only two of which are labelled in the figures. The plurality of blades 2 are rotatably mounted to the frame 1. Each of the blades 2 is mounted to the frame 1 such that each blade is rotatable about a respective rotational axis between an open rotational position, in which air can flow through the damper, and a closed rotational position, in which air, smoke and fire are substantially prevented from moving through the damper. In the embodiment shown the blades 2 comprise a main blade portion 3 connected to one or more supports **3*a* located along the respective rotational axis A1, A2 as labelled in FIGS. 2 and 3. The rotational axis may be along a longitudinal central axes of each of the blades 2. The supports 3*a* rotatably engage the frame 1**.

During a fire the blades 2 will rotate into the closed position to prevent the spread of smoke and fire through the damper. In the embodiment shown the supports **3*a* of the blades 2 are mounted to the first sides 4 of the frame 1 and are substantially parallel and spaced apart vertically. In other embodiments the blades 2** may be mounted in a different orientation.

Figure 12:
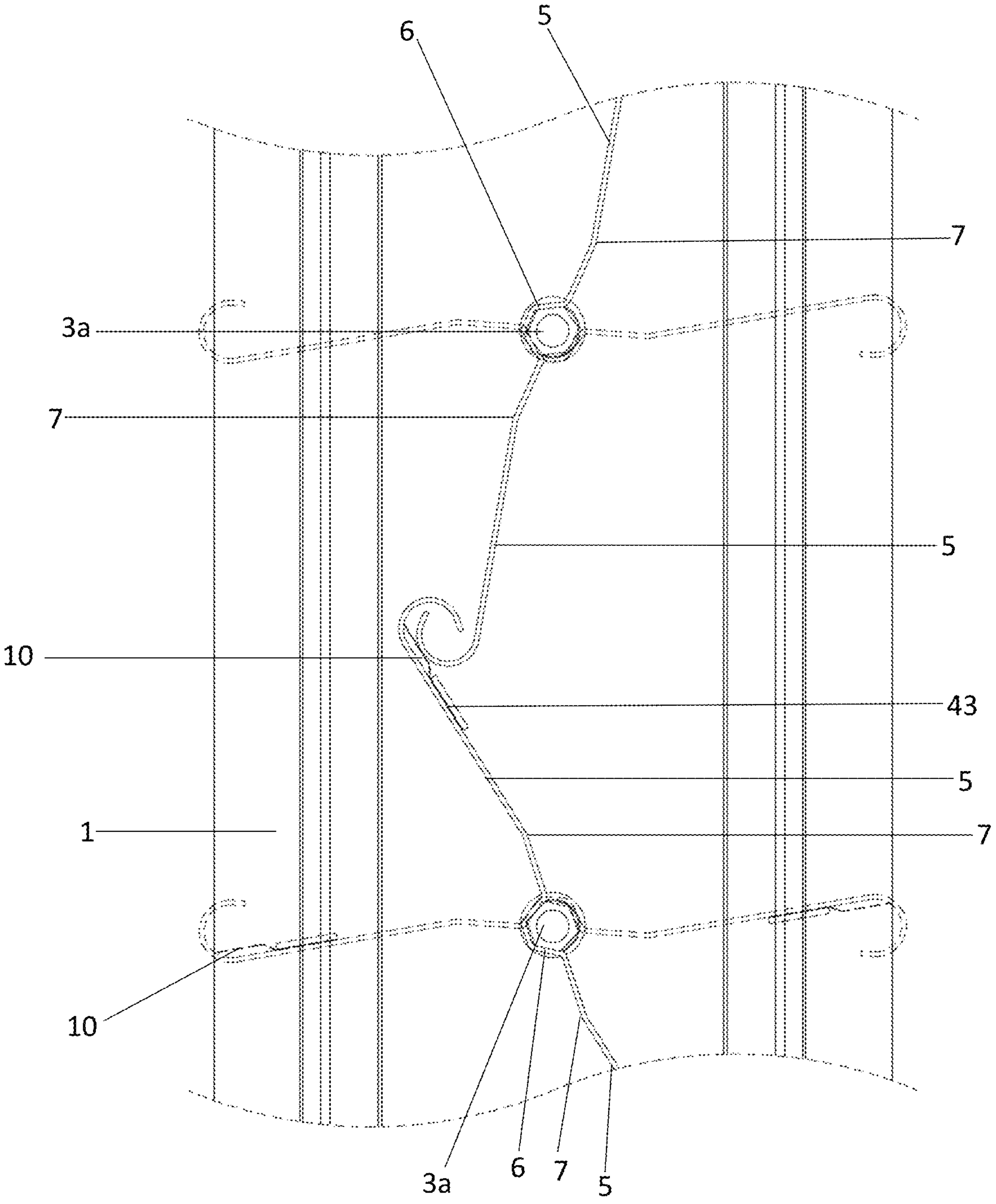
FIG. 12 shows an enlarged view of a portion of two of the blades indicated in FIG. 11.
Figure 13:
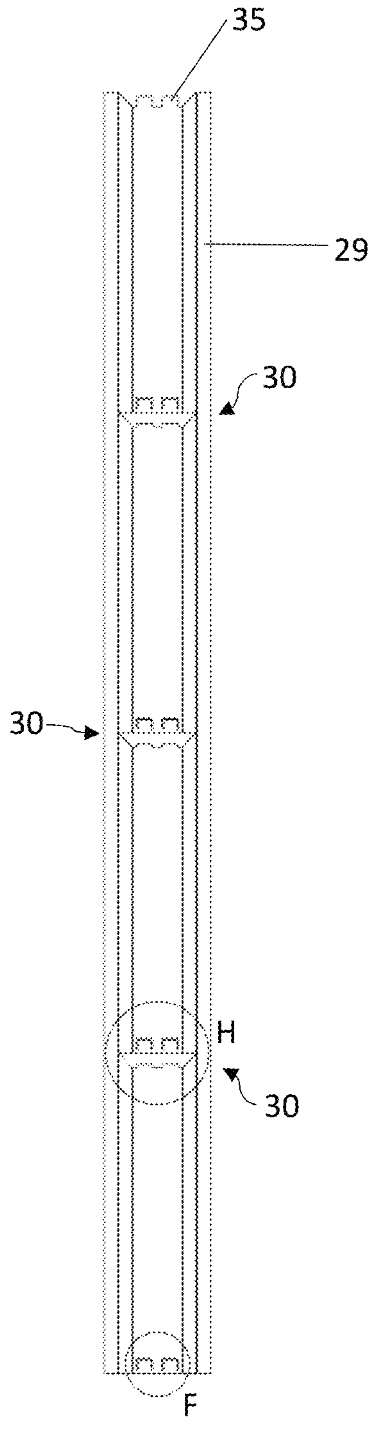
FIG. 13 shows a front view of a partially formed fire damper frame according to FIG. 1.
Figure 14:
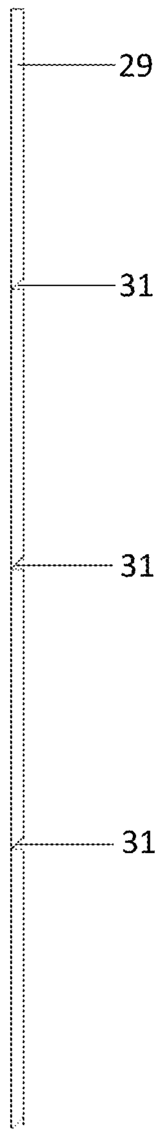
FIG. 14 shows a left-side view of the partially formed frame of FIG. 13.

In the embodiment shown the support **3*a* is formed from a metal bar which has a substantially hexagonal cross-section. In alternative embodiments the support 3*a* may have a different cross-sectional shape, for instance, circular, rectangular or square. The main blade portions 3 may be formed from a metal sheet. As best seen in FIG. 12, each blade may comprise at least one substantially planar portion 5. In the embodiment shown each main blade portion 3 comprises a longitudinal groove 6 along the longitudinal central axis of the blade configured to receive the supports 3*a*. In the embodiment shown, the main blade portion 3 comprises two substantially planar portions 5 located on either side of the groove 6. The blade 2 may further comprise at least one bend 7** between the central rotational axis and the longitudinal side edge portion of the blade.

Figure 6:
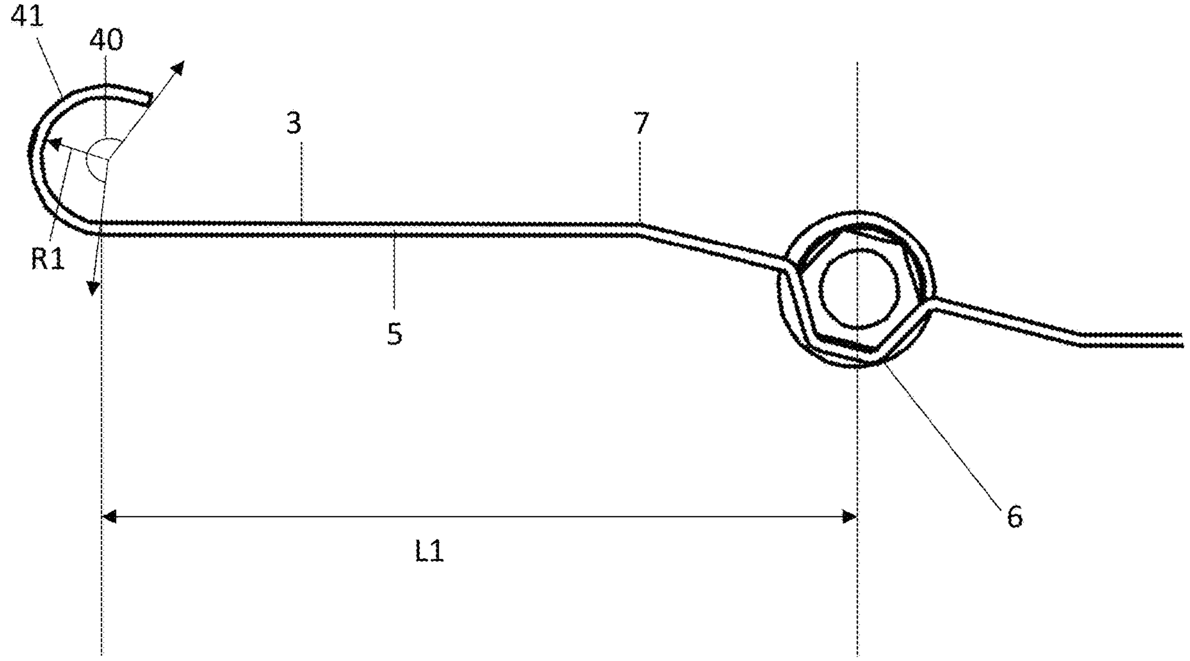
FIG. 6 shows an enlarged transverse cross-section of one side of a blade of the fire damper of FIG. 1.

When the fire damper 100 is in the closed rotational position, the side edge portions of adjacent blades 2 may be configured to engage to form a seal that prevents smoke and fire from passing through the blades 2 of the fire damper 100. In the embodiment shown, the side edge portion of the blade 2 is curved away from a plane of the adjacent substantially planar portion 5. The side edge portion may be curved to form a hook-like portion, when viewed in transverse cross-section, as shown in FIG. 6. The central angle 40 of the curve 41 of the hook-like portion is in the range 180°-200°. In the embodiment shown the central angle 40 is 194°.

The side edge portion preferably comprises a partial surface of revolution, such that the curve 41 is an arc. The radius of curvature R1, i.e. the radius of the imaginary circle that would complete the curve of the hook-like portion, is in the range 5 mm-8 mm. In the embodiment shown the radius of curvature is 6.5 mm.

In one embodiment a ratio of the radius R1 of the arc and the distance L1 between the rotational axis A1 of the blade and boundary between the planar portion 5 and the side edge portion is between 1:10 and 1:15, preferably substantially 1:12.

Figure 8:
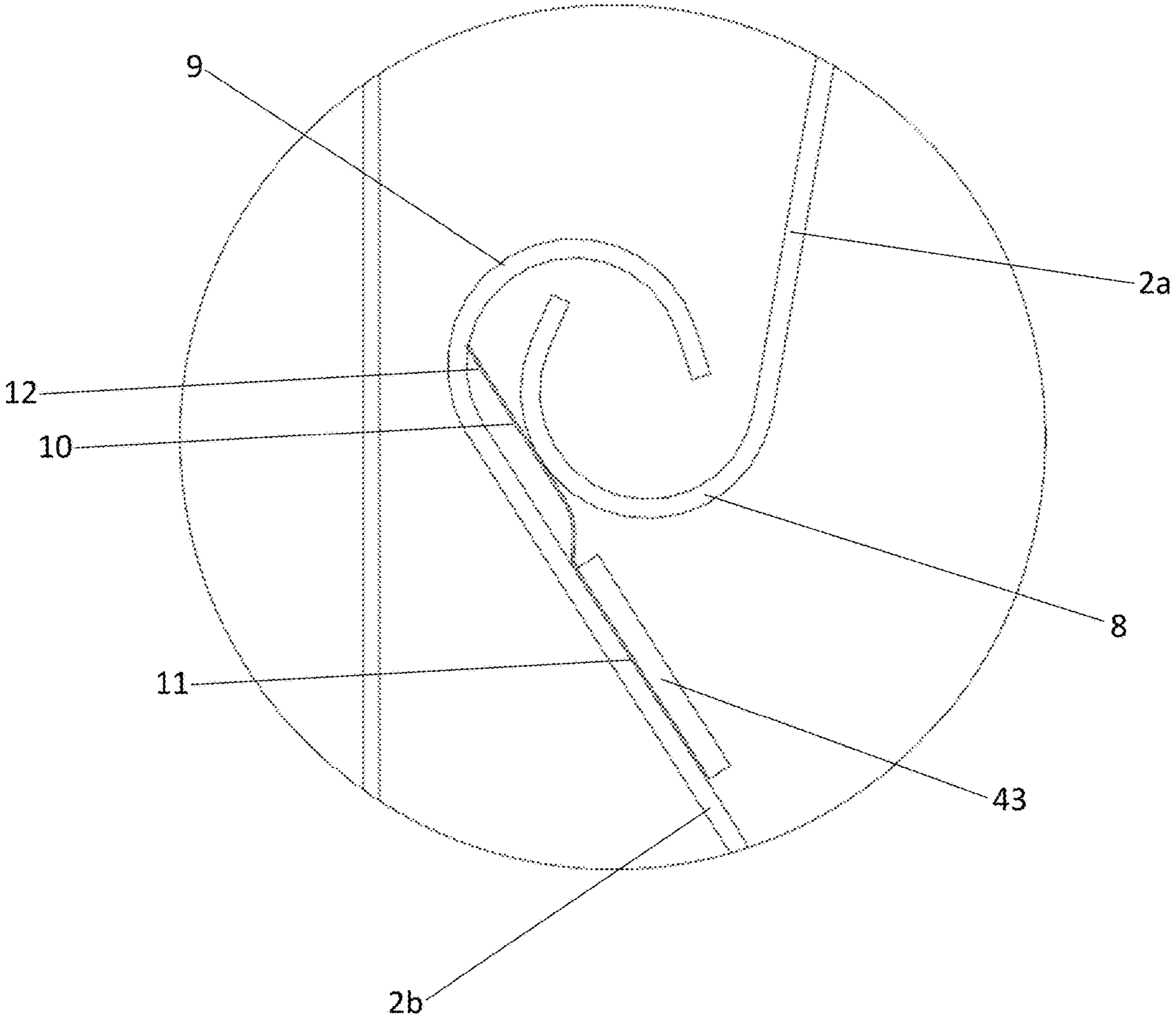
FIG. 8 shows an enlarged view of area D indicated in FIG. 5.

As shown in FIG. 8, a first curved side edge portion 8 of a first 2*a* of the plurality of blades 2 is adapted to engage a second curved side edge portion 9 of a second 2*b* of the plurality of blades 2 when the blades 2*a*, 2*b* are in the closed rotational position.

The fire damper 100 may also have a resiliently flexible sealing member 10 provided on at least one of the blades 2 and adapted to abut a surface of an adjacent blade when the blades 2 are in the closed rotational position. The sealing member 10 is configured to prevent any leakage of smoke or fire between adjacent blades. In the embodiment shown every second blade of the plurality of blades 2 is provided with a sealing member 10 adjacent each of the side edge portions. The sealing member 10 is located on the inner side of the hook-like portion and is configured to abut an outer surface of the hook-like portion on the bottom side edge of an adjacent blade, for example a blade located directly above it. The sealing member 10 may comprise a thin sheet of metal that is fixed on one side 11, as shown in FIG. 8, to the planar portion of the blade 2. In some examples, this is achieved by spot welding the sealing member 10 to the blade 2, but in other instances rivets or seam welding may be used. In the embodiment shown, a further layer 43, usually comprising steel, covers the sealing member and is spot welded to the blade, thereby securing the sealing member to the blade. The opposite side 12 of the sealing member 10 is located in the space formed by the curve of the side edge portion, as shown in FIG. 8. The free opposite side 12 is biased towards a rest position in which it extends at an angle away from the surface of the blade 2. The free side 12 of the sealing member 10 is configured to bend towards the blade 2 when contacted. In use, when the blades 2 rotate to the closed rotational position the sealing member 10 is deflected from its rest position to a sealing position by the end portion of an adjacent blade 2. When in the sealing position the free side 12 forms a smaller angle with respect to the blade when compared to the rest position. This can be seen in FIG. 8 which shows a resilient sealing member 10 provided on the second blade 2*b* that abuts the first curved side edge portion 8. In some embodiments the sealing member 10 may be configured to bend to contact a larger area of the curved side edge portion 8 of the opposite blade. This may assist in providing a better seal and preventing leakage. In other embodiments, the sealing members 10 may be provided to blades 2 of a different fire damper 100 for instance a fire damper 100 where the blades all rotate in the same direction.

When the blades 2 of the fire damper 100 rotate from an open rotational position to a closed rotational position they rotate through an angle of rotation that is at least 100°. In some examples, the angle is between 100° and 120°. In the embodiment shown the angle of rotation of the blades 2 is 111°. This rotation engages the curved side edge portions 8, 9 of adjacent blades such that they interlock. As best seen in FIG. 8, the ends of the hook-like portions of the adjacent blades are curved in opposite directions, towards each other, to assist in preventing unintentional disengagement. The interengagement of the blades 2 when in the closed rotational position may therefore ensure that the blades stay sealed together even in conditions when the blades 2 may deform due to the combination of pressure and heat caused by a fire. In extreme circumstances (for example during certification testing) the blades 2 may deform to a bow shape which curves away from the inlet side of the fire damper 100. In these circumstances it is important that the blades remain sealingly engaged. This is achieved by the overlap of the hook-like portions of the side edge portions of the blades 2. The blades are preferably configured such that this overlap is increased when the angle of rotation is greater than 100°. As seen in FIG. 8 the overlap of the hook-like portions in the direction of the airflow is sufficient to ensure continuing engagement of the blades 2 even if the blades 2 were to deform.

Figure 11:
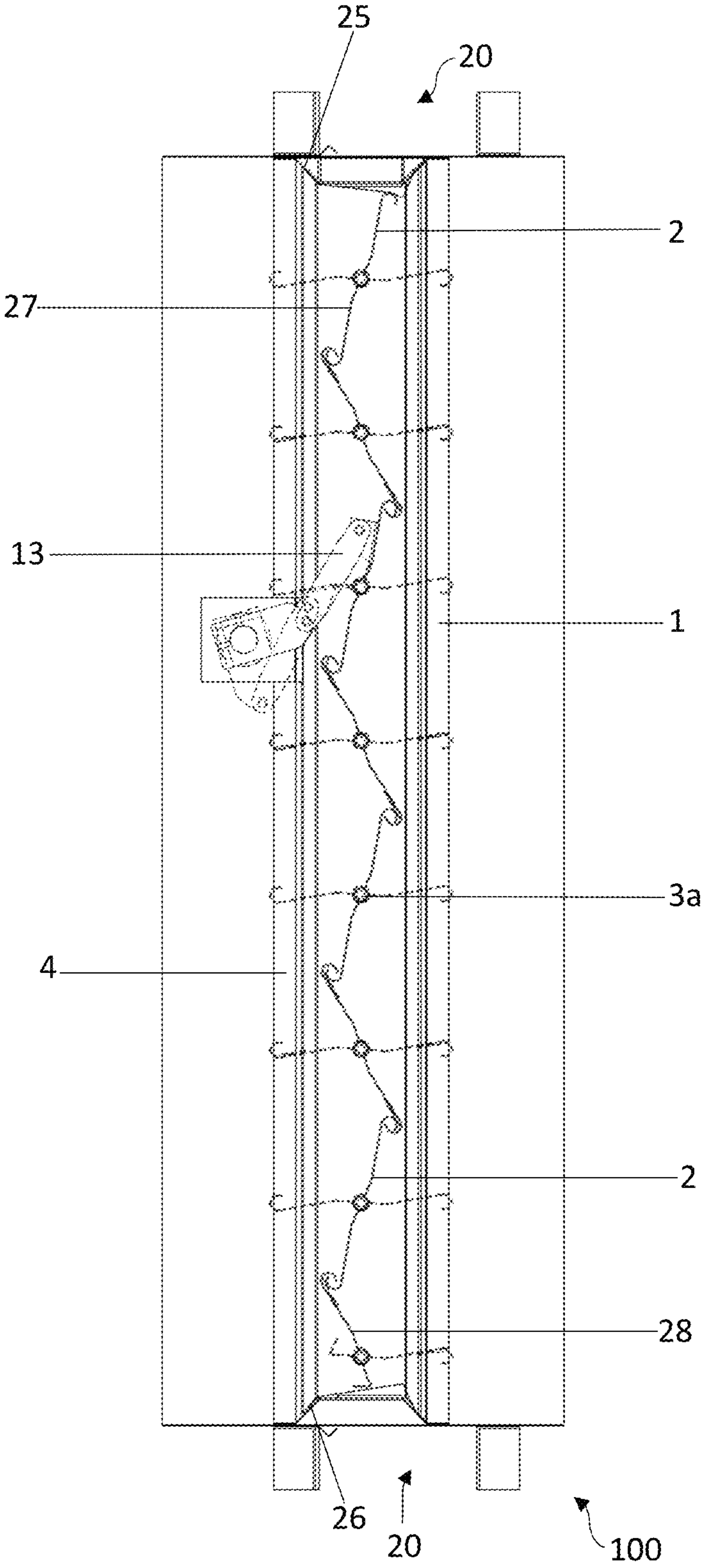
FIG. 11 shows the cross-sectional view of FIG. 5 with the fire damper shown in the open rotational position in dashed lines.

FIGS. 11 and 12 show the blades 2 in the open rotational position in dashed lines. Alternate blades 2 rotate in opposite directions. For instance, in the view shown in FIG. 11 the bottom blade rotates anti-clockwise and the adjacent blade above it rotates clockwise when moving from the open rotational position to the closed rotational position. In other examples the blades may rotate in the opposite direction. In this embodiment, the supports 3*a* have a hexagonal cross-section and the blades 2 extend from the groove 6. The groove 6 may be shaped to clip over a portion of the hexagonal supports 3*a*. In the embodiments shown, due to the shape of the groove 6 and the angle at which the blade 2 extends from the groove 6, bends 7 in the blades 2 are provided to ensure correct positioning and engagement of the hook-like portions. In other embodiments the bends 7 may not be required.

In preferred embodiments, the fire damper 100 comprises a linking system 13, such as that shown in FIG. 11, which is configured to convert a 90° rotation of the motor to the desired rotation of the blade. The fire damper 100 may in some embodiments comprise a biasing means which bias the blades towards the closed rotational position. This biasing means may comprise at least one spring.

In preferred embodiments, the fire damper 100 comprises a frame 1 comprising two pairs of opposed sides. The first pair of opposed sides may be lateral sides 4 of the frame 1. The second pair of opposed sides may be the top and bottom of the frame 1. FIGS. 5, 7, 9 and 10 show a sealing means provided on at least one of the sides of the frame. The sealing means may comprise an intumescent material provided on an inner surface of the frame and a cover provided over the intumescent material. At least a part of the cover may be configured to move towards the centre of the fire damper when the intumescent material expands during a fire. In preferred embodiments, a sealing means may be provided to each of the sides of the frame 1 to minimise leakage of the fire damper 100. The sealing means are described in further detail below.

Figure 9:
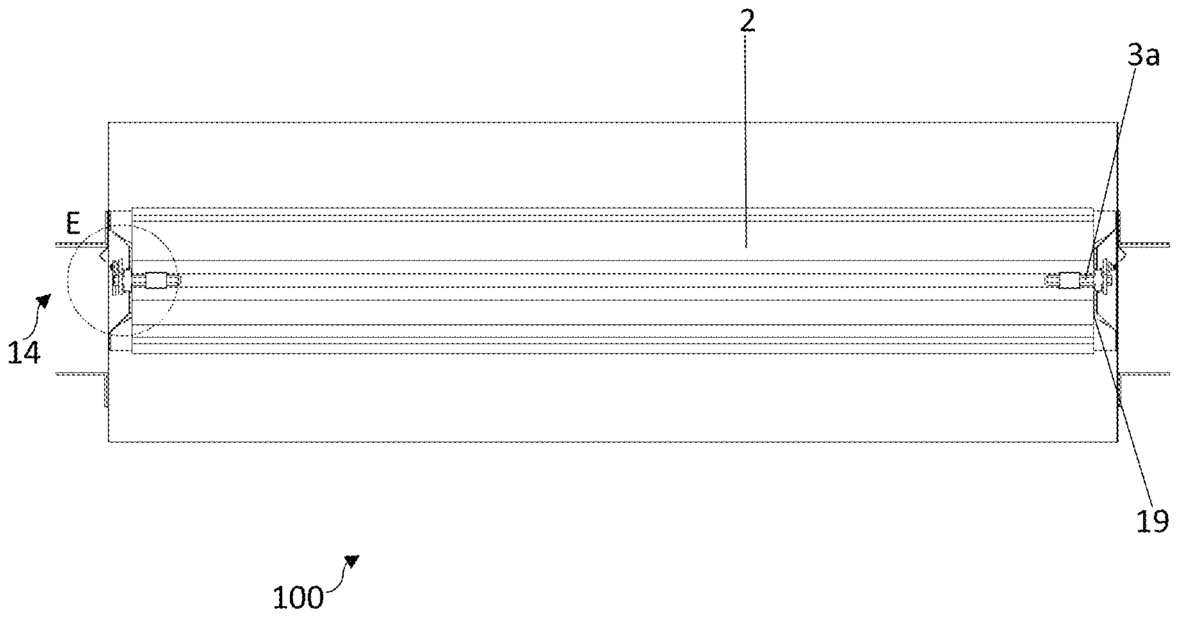
FIG. 9 shows a cross-sectional view of the fire damper of FIG. 3 along plane B-B.
Figure 10:
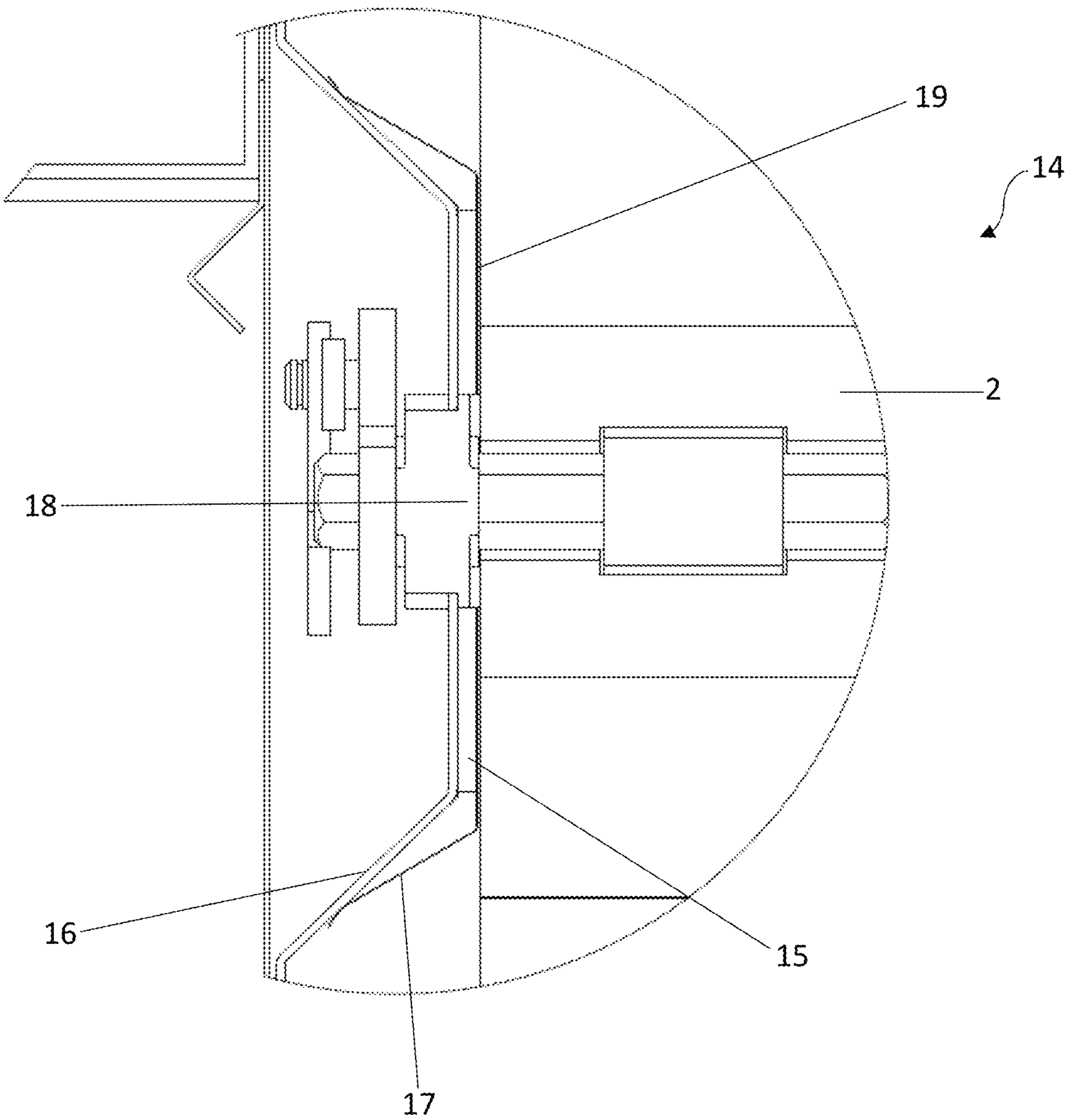
FIG. 10 shows an enlarged view of area E indicated in FIG. 9.

As shown in FIGS. 9 and 10, the fire damper 100 may also comprise a first sealing means 14 provided on at least one side of the frame 1. The first sealing means 14 comprises a first intumescent material 15 provided on an inner surface of the frame 16 and a first cover 17 provided over the first intumescent material 15 and configured to move towards the centre of the fire damper 100 when the first intumescent material 15 expands. In the embodiment shown, the first cover 17 is formed from a flexible metal sheet. The first cover 17 comprises a planar portion with two flanges extending at an angle from two of the sides. The shape of the first cover 17 preferably takes a substantially similar shape as the profile of the frame 1. The first cover 17 is not fixed with respect to the side of the frame 1 and can move toward the centre of the frame (i.e. towards the ends of the blades 2) when the first intumescent material 15 expands. In a rest position, where there is no fire, a portion of the two flanges of the first cover 17 contacts the frame 1. The frame 1 may comprise a first sealing means 14 on both of the first sides 4 of the frame 1 to which the blades 2 are mounted. The first sealing means 14 comprises a plurality of apertures 18 which are configured to receive the supports 3*a* of the blades 2. During a fire the first intumescent material 15 expands and the first cover 17 also moves. The first cover 17 may no longer contact the frame 1 when it moves. The first sealing means 14 forms a seal to prevent leakage between the first sides 4 of the frame 1 and the end portions 19 of the blades 2. During severe fire conditions the pressure on the fire damper 100 may cause the blades 2 of the fire damper 100 to curve and form a bow shape. This may cause the end portions 19 of the blades 2 to move further away from the first sides 4 of the frame 1. In these conditions the first sealing means 14 assist in ensuring minimal leakage by bridging the gap between the first sides 4 and the end portions 19 of the blades 2. The first intumescent material 15 expands and moves the first cover 17 towards the centre of the fire damper 100. The first cover 17 should ideally maintain contact with the end portions 19 of the blades 2.

Figure 5:
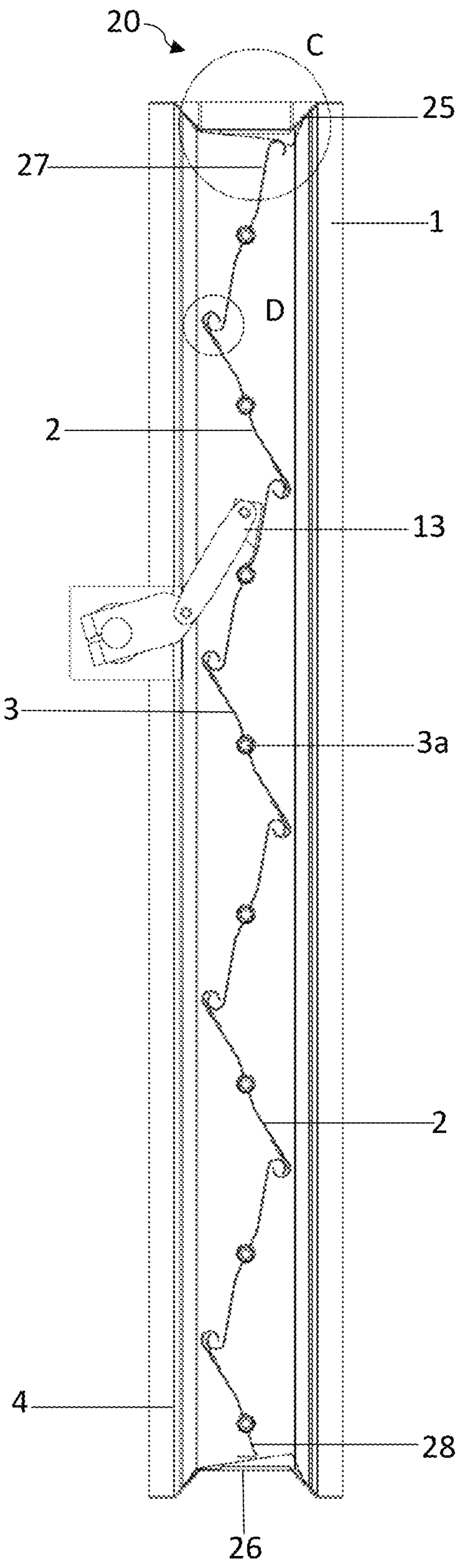
FIG. 5 shows a cross-sectional view of the fire damper of FIG. 3 along plane A-A.
Figure 7:
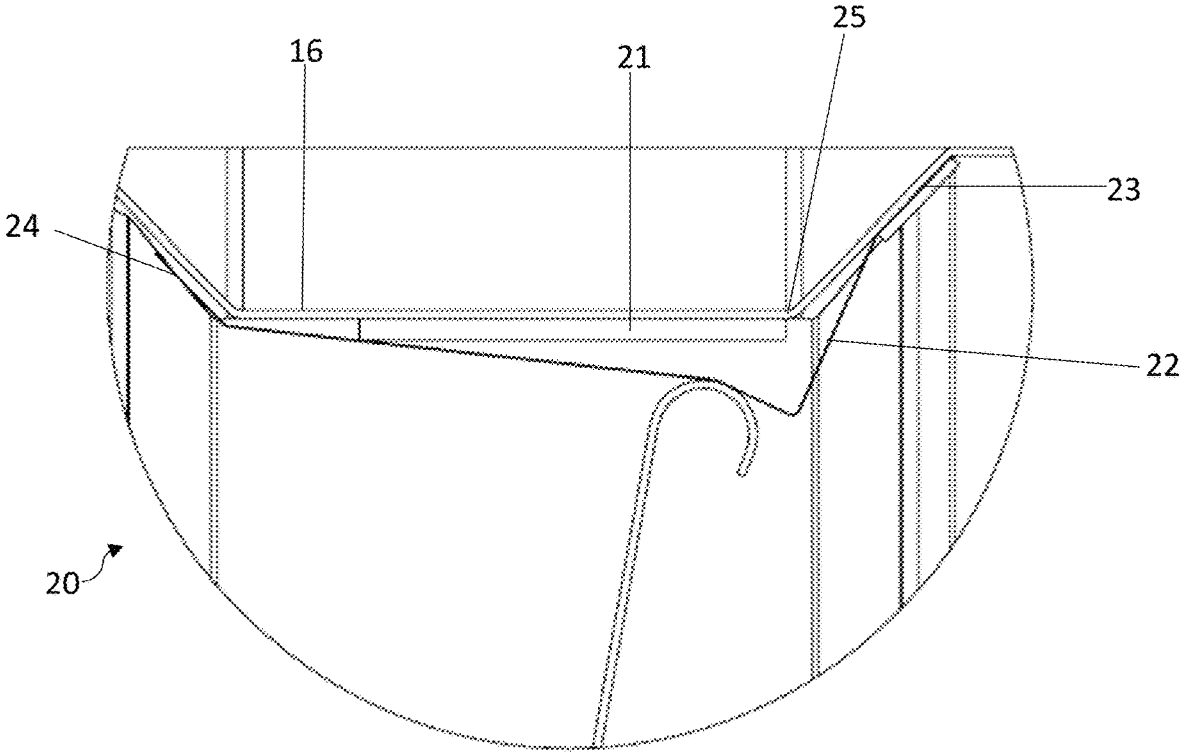
FIG. 7 shows an enlarged view of area C indicated in FIG. 5.

As shown in FIGS. 5 and 7, the fire damper 100 may further comprise a second sealing means 20 provided on at least one side of the frame 1. The second sealing means 20 comprises a second intumescent material 21 provided on an inner surface of the frame 16 and a resiliently flexible second cover 22 configured to fit over the second intumescent material 21. A first edge 23 of the second cover 22 is fixed relative to the frame 1. A second edge 24 of the second cover 22 opposite the first edge 23 moves towards the centre of the fire damper 100 when the second intumescent material 21 expands. In the embodiment shown the second cover 22 comprises a flexible metal sheet. The second cover 22 comprises a planar portion with two flanges extending at an angle from two of the sides. In the embodiment shown a first flange comprises the first edge 23 and the second flange comprises the second edge 24. The first flange extends further from the planar portion than the second flange. This causes the planar portion to be positioned on an angle with respect to the face of the frame on which the second intumescent material is mounted during normal conditions. During normal conditions the second flange contacts the inner surface of the frame 16. During a fire the second intumescent material 21 expands and the second edge 24 moves away from the inner surface of the frame 16. In some embodiments a further cover (not shown) may be positioned over the second edge 24 to prevent vibration, and therefore generation of noise, of the second edge 24 during normal conditions. The further cover may extend up from the frame 1 to prevent the second edge 24 from being captured by the airflow flowing through the fire damper 100 in non-fire conditions. The further cover is configured to allow the second edge 24 to move away from the inner surface of the frame 16 as required during a fire. The further cover may comprise a sheet material and is preferably formed from a steel or stainless-steel sheet. In the embodiment shown in FIG. 5 second sealing means 20 are provided on the top 25 and bottom 26 sides of the frame 1. The two second sealing means 20 are provided such that the first edge 23 is closer to an inlet of the fire damper 100 than the second edge 24. In alternate embodiments (not shown) this may be reversed and the first edge 23 may be closer to the outlet of the fire damper 100 compared to the second edge 24. When the blades 2 are in a closed rotational position the topmost blade 27 and the bottommost blade 28 contact the second covers 22 of the respective second sealing means 20. In the view shown in FIGS. 5 and 7 the topmost blade 27 rotates from the open rotational position to the closed rotational position in the clockwise direction. As the second intumescent material 21 expands and the second edge 24 moves away from the top side 25, the planar portion of the second cover 22 bends away from the frame and towards the centre of the fire damper 100. This assists in ensuring an adequate seal between the top side 25 and the topmost blade 27 to prevent any leakage occurring, especially in conditions where a gap would otherwise form between the side portion of the blade and the top side 25 due to deformation of the blade. Similarly, the bottommost blade 28 rotates from the open rotational position to the closed rotational position in the anti-clockwise direction and forms a seal with second cover 22 which bends to assist ensuring a seal between the bottom most blade 28 and the bottom side 26. In the embodiment shown the bottommost blade 28 is not the same size and shape as the other blades. The bottom half of the bottommost blade 28 may have a shorter width, and in the embodiment shown is only substantially half the width of the other blades. Instead of having a rounded hook-like end portion the longitudinal bottom edge of the blade may be instead bent at an angle. Having a bend at the end of the blade 2 improves the ease and speed of manufacturing rather than having to form a hook-like end portion which would not serve any additional purpose on the bottommost blade 28 or the topmost blade 27. In alternative embodiments, the topmost blade 27 may also be of a different size. In other embodiments, the bottommost blade 28 may be the same size as the other blades.

The first and second covers 17, 22 of the first and second sealing means 14, 20 provide a number of advantages. Exposure of the intumescent materials 15, 21 to the high velocity airflow can cause delamination of the intumescent materials 15, 21 and result in particles of the intumescent material 15, 21 entering the airflow. The covers 17, 22 contain the first and second intumescent materials 15, 21. This ensures that portions of the intumescent materials 15, 21 do not enter the air stream flowing through the fire damper 100. The covers 17, 22 also protect the intumescent materials 15, 21 and ensure that lint does not build up on the material. Damage to or build up of lint on the intumescent materials 15, 21 could negatively affect the function of the intumescent material. While the fire damper 100 above has been described by reference to embodiments which are provided with hook-like side edge portions 8,9, a flexible sealing member 10 and first and second sealing means 14, 20 in combination, other embodiments may combine any one or more of these features but not the others.

The fire damper 100 may comprise a number of metal components. Preferably the material of the fire damper is substantially fire resistant and maintains strength at high temperatures. In some embodiments the fire damper 100 and/or various components of the fire damper 100 comprise steel.

Figure 17:
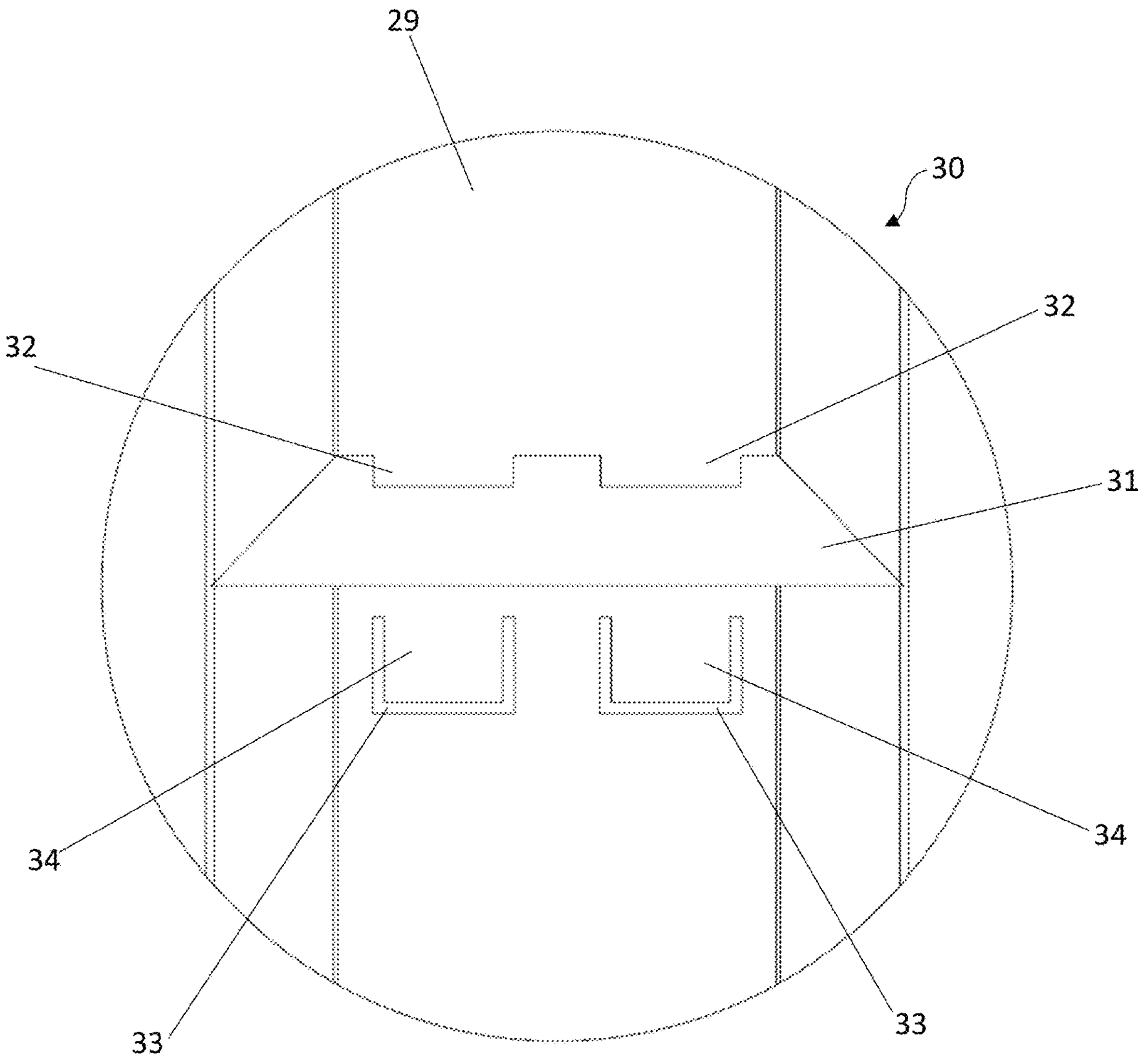
FIG. 17 shows an enlarged view of area H indicated in FIG. 13.

Referring to FIGS. 13 to 17 a partially formed frame 1 for a fire damper 100 is shown. The frame 1 may be formed from a strip 29 of sheet metal. The strip 29 is configured to be bent at three locations and the ends joined to form the square frame 1. In the embodiment shown the sides of the frame 1 are all the same length although in other embodiments the frame 1 may be rectangular in shape and the sides may vary in length. The strip 29 has three corner forming portions 30, each with cutouts having a generally isosceles trapezium shape 31, as best seen in FIG. 17, the isosceles trapezium having one pair of parallel opposite sides and the other pair of opposite sides being of the same length. Each of the cutouts further defines at least one tab, more preferably two rectangular tabs 32, protruding from the shorter of the parallel sides of the trapezoid shape. Each of the corner forming portions 30 further has at least one, more preferably two, generally U-shaped slots 33 on the opposite side of the cutout to the tabs 32. The U-shaped slots 33 form resilient flap portions 34. The base of each U-shaped slot 33 is preferably substantially straight, and the width of the base is at least equal to the width of the adjacent tab 32.

Figure 15:
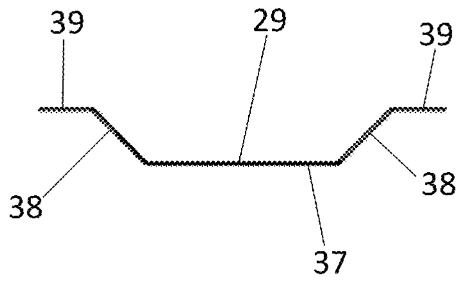
FIG. 15 shows a top view of the partially formed frame of FIG. 13.
Figure 16:
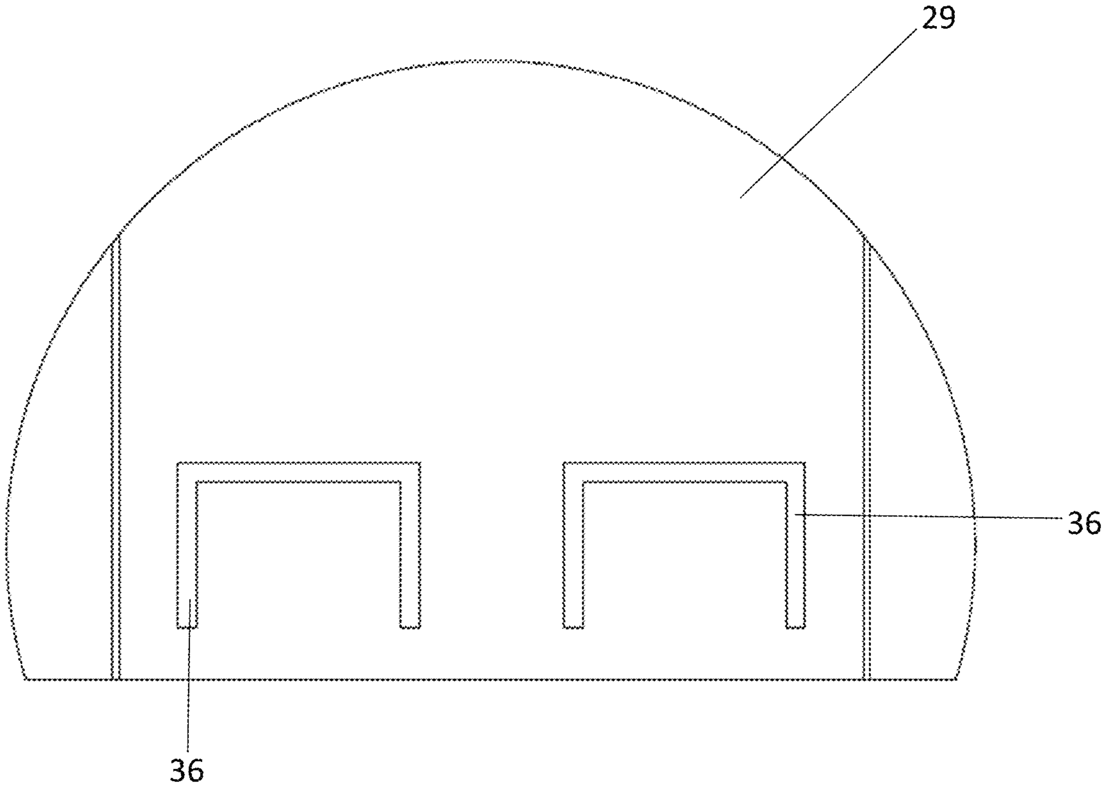
FIG. 16 shows an enlarged view of area F indicated in FIG. 13.

With the cutouts and slots formed, the strip 29 is formed to have a non-planar profile, for example by roll forming. As shown in FIG. 15 the profile of the strip 29 may be formed to have a substantially planar portion 37 with two angled portions 38 and two end flanges 39. The two angled portions 38 extend from two sides of the planar portion 37 at an angle. The two end flanges 39 extend from the two angled portions 38 and are substantially coplanar and are substantially parallel to the planar portion 37. The profile of the frame 1 increases the stiffness of the frame 1 and allows the tabs 32 to engage the slots 33. The profile may also allow the frame 1 to contain the linking system 13.

The frame is formed by folding the strip at each corner forming portion. Each fold is generally aligned with the long edge of the isosceles trapezoid shape cutout 31. As the corner portion 30 is folded the tabs 32 of each corner forming portion insert into the corresponding U-shaped slots 33. As the tabs 32 are inserted into the slots 33 the resilient flap portions 34 may deflect outwardly to allow the tabs 32 to insert into the slots 33. The flap portions 34 revert to their original position after the tabs 32 are correctly inserted.

One end of the strip 29 also has at least one, more preferably two, cutout tabs 35 and the opposite end of the strip 29 has at least one, more preferably two, corresponding cutout U-shaped slots 36 or more preferably simple rectangular slots. After the three corner portions 30 are folded the end tabs 35 are inserted into the corresponding end U-shaped slots 36 (or rectangular slots) forming a right angle between the two adjacent sides. Once the ends of the strip 29 are engaged (and fastened together by folding the tabs 36 over and/or welding etc) a frame 1 ready for use is formed. Alternative embodiments may have protrusions and slots of different shapes. Different numbers of tabs and slots/flaps may also be used.

The strip 29 of sheet metal also has circular cut outs on two opposite sides, not shown, for the attachment of the plurality of blades 2. The shape of these cut outs corresponds with bearings to be mounted to the frame 1 for receiving the supports 3*a*.

Those skilled in the art will appreciate that the method described above allows a rigid rectangular frame to be created from a single sheet of steel with minimal fastening actions. The method may be used to manufacture a frame for use with any shape of blade. The damper, when completed, may be used with one or both of first and second sealing means 14, 20, or with no such sealing means.

Figure 18:
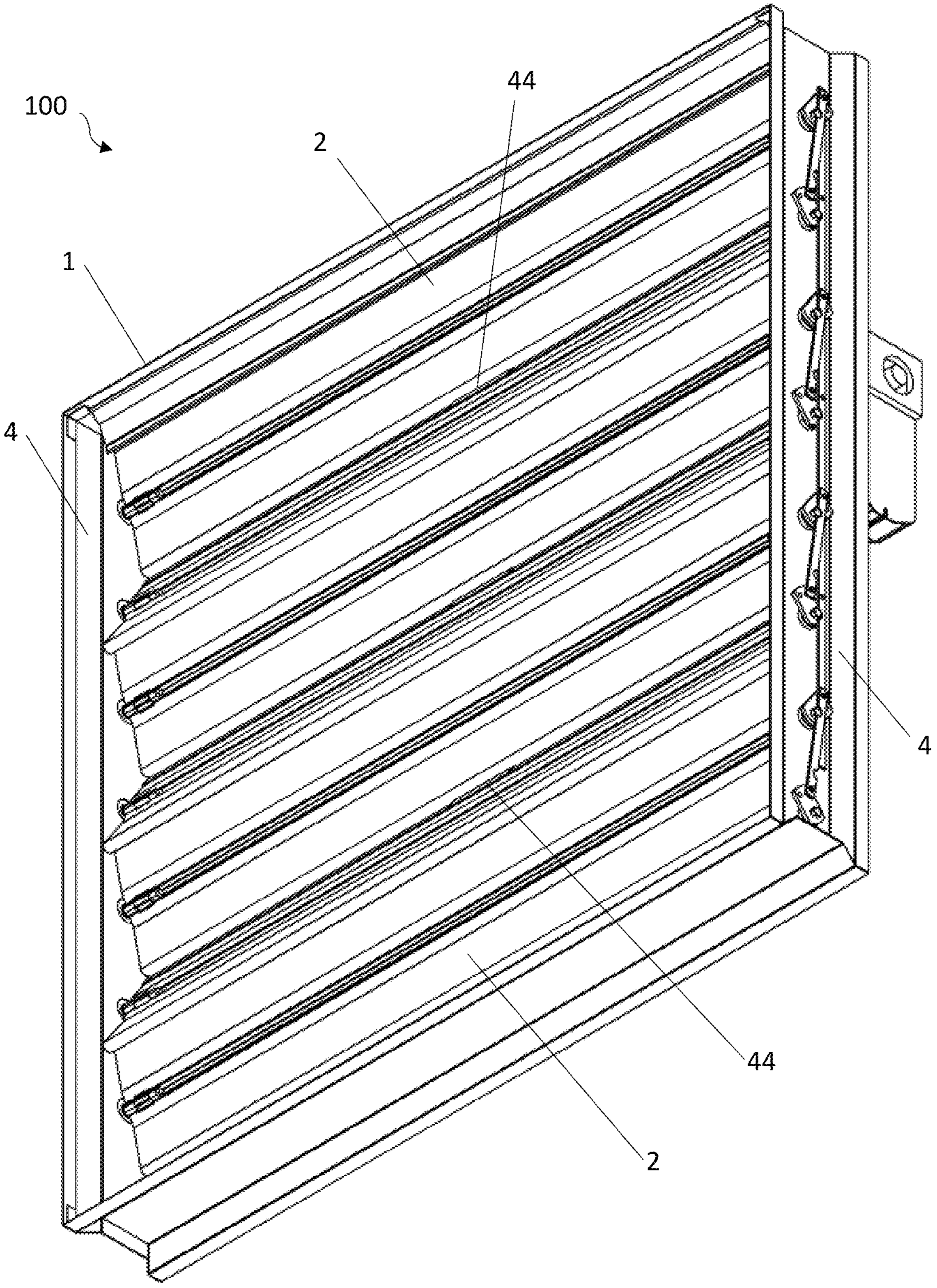
FIG. 18 shows a front (inlet end) perspective view of a fire damper with blades in a closed rotational position and the bimetallic strips in a rest position according to a further embodiment of the present invention.
Figure 19:
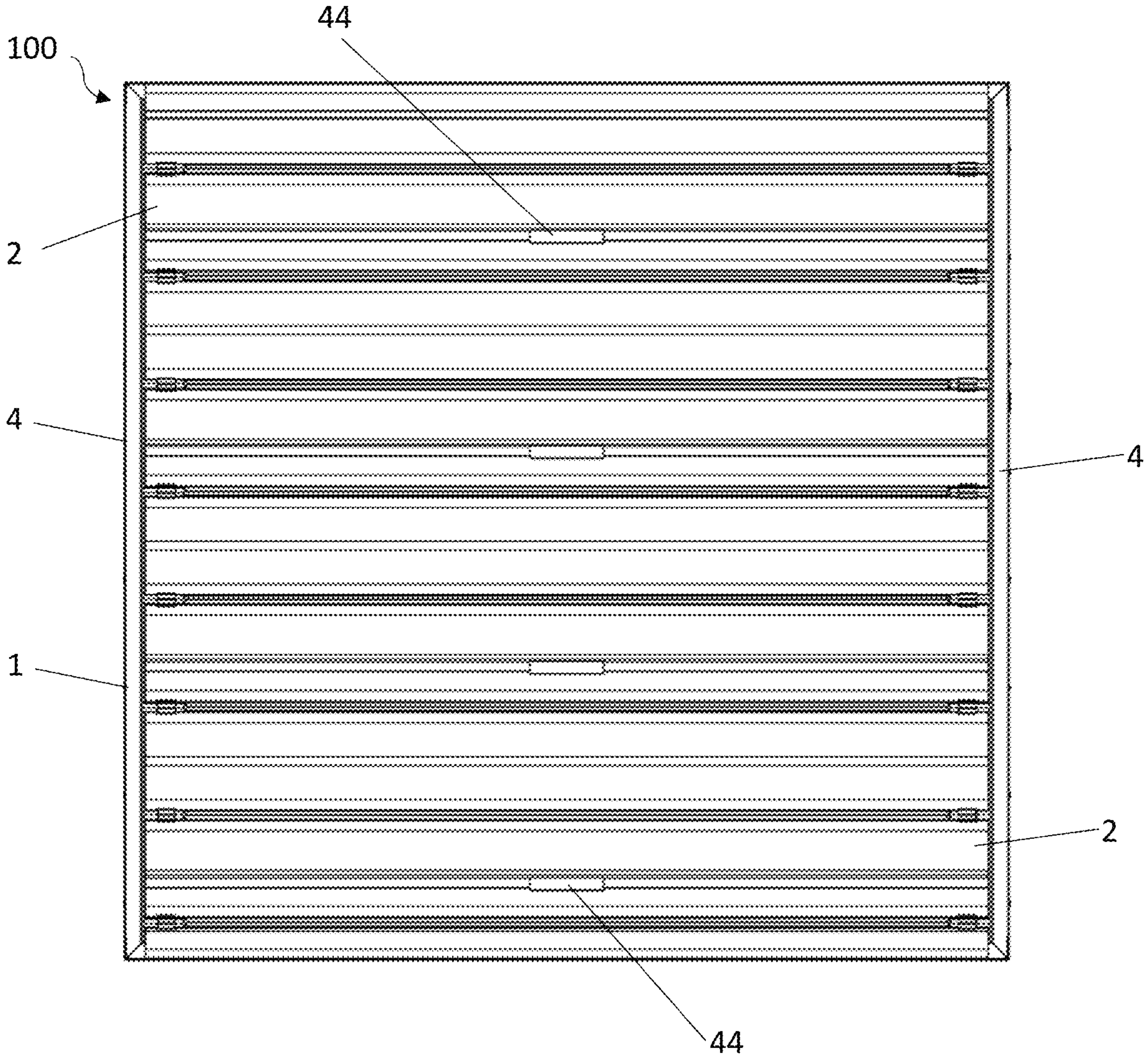
FIG. 19 shows a front (inlet end) view of the fire damper of FIG. 18.
Figure 20:
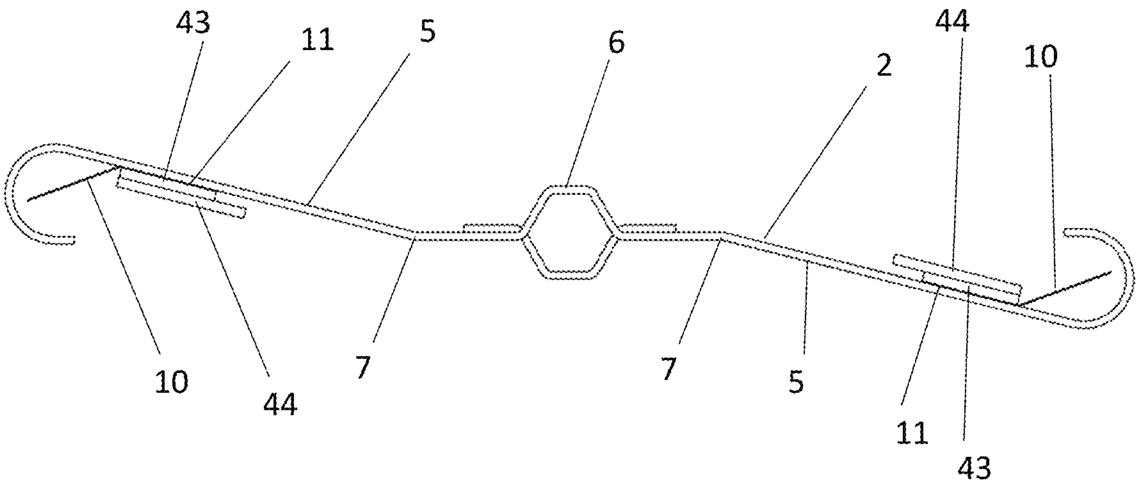
FIG. 20 shows an enlarged transverse cross-section of one side of a blade of the fire damper of FIG. 18.
Figure 21:
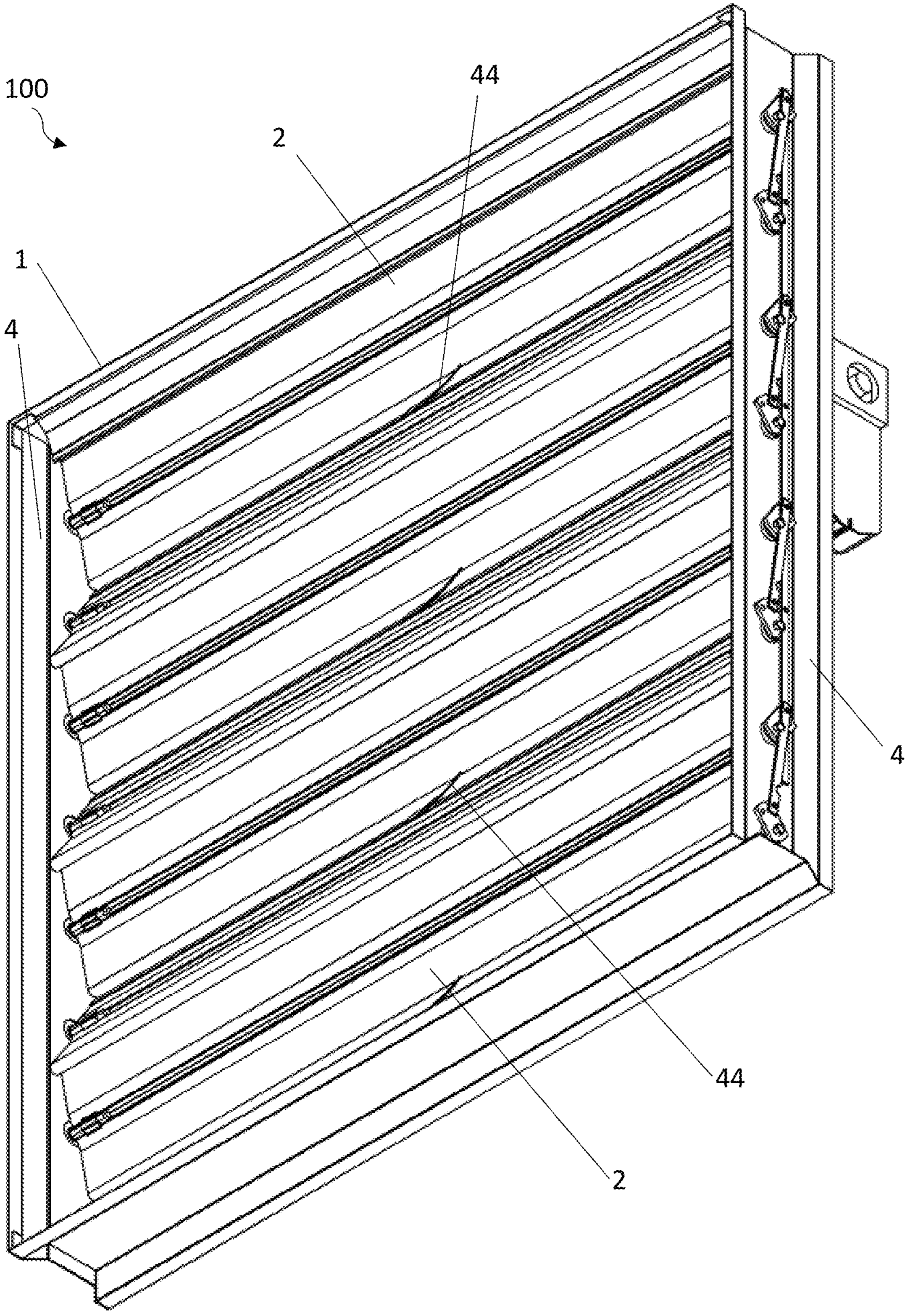
FIG. 21 shows a front (inlet end) perspective view of the fire damper of FIG. 18 with the bimetallic strips in a bent position.
Figure 22:
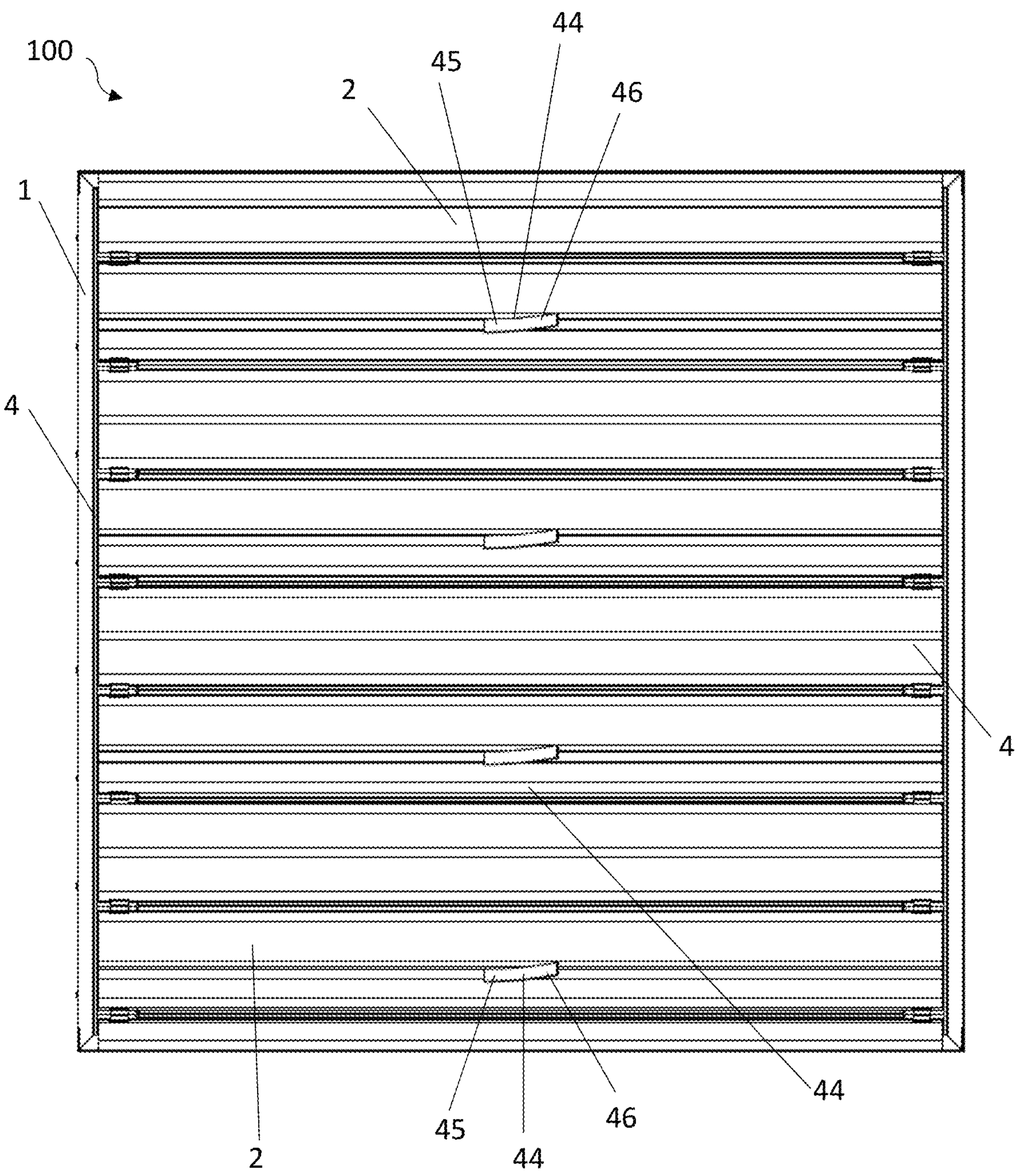
FIG. 22 shows a front (inlet end) view of the fire damper of FIG. 21.
Figure 23:
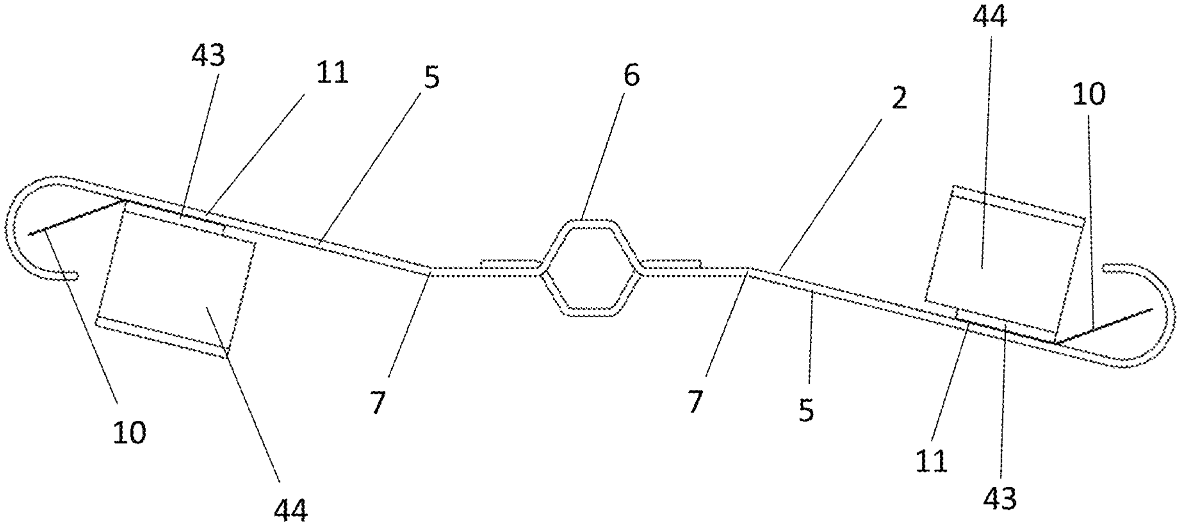
FIG. 23 shows an enlarged transverse cross-section of one side of a blade of the fire damper of FIG. 21.

Referring to FIGS. 18-23 a fire damper 100 according to another embodiment is shown. The fire damper 100 shown is substantially similar to the embodiment described above. The fire damper 100 in this embodiment, additionally comprises bimetallic strips 44. The bimetallic strips 44 activate once the blades 2 of the fire damper 100 have moved into the closed rotational position and are configured to maintain the blades 2 of the fire damper 100 in the closed rotational position. In the embodiment shown every second blade of the plurality of blades 2 is provided with a bimetallic strip 44 adjacent each of the side edge portions 8, 9. The bimetallic strip 44 may be located on the inner side of the hook-like portion and fixed at one end 45 to the planar portion of the blade 2. In some examples, this is achieved by spot welding the bimetallic strip 44, in other instances rivets or seam welding may be used. In the embodiment shown the bimetallic strip 44 is in the same location of the blade 2 as the fixed side 11 of the sealing member 10 and is attached at fixed end 45 to the further layer 43. In the embodiment shown, the bimetallic strip is oriented such that the longitudinal axis of the bimetallic strip is substantially parallel with the longitudinal axis of the blades 2. In the embodiment shown the fixed end 45 is at an opposite end of the bimetallic strip 44 to an unfixed end 46. The unfixed end 46 is also closer to one of the lateral sides 4 of the frame 1 in comparison to the opposite fixed end 45. FIGS. 18 to 20 show the bimetallic strips 44 in a resting position in which they are substantially flat or unbent. In use, once the blades 2 rotate to the closed rotational position the temperature and heat of the fire and smoke result in the unfixed end 46 of the bimetallic strips bending away from the planar surface of the blade 2, as shown in FIGS. 21 to 23. As the bimetallic strip 44 bends it overlaps the two engaged side edge portions 8, 9 of adjacent blades 2. By overlapping the side edge portions of the blades 2, the bimetallic strip 44 assists in preventing disengagement or separation of the hook-like portions of the adjacent blades 2. In the embodiment shown the bimetallic strips 44 are located in a central region of the blades 2, i.e. they are centrally located between the two lateral sides 4 of the frame 1. This may be a location where the blades are more likely to disengage due to the blades deforming to a bow shape which curves away from the inlet side of the fire damper 100 as described above. In other embodiments the bimetallic strips 44 may be located closer to the frame 1 of the fire damper 100. In some embodiments there may be more than one bimetallic strip 44 along each of the side edge portions 8, 9.

Reference to any prior art in this specification is not, and should not be taken as, an acknowledgement or any form of suggestion that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof.

The invention claimed is:

1. A fire damper comprising:

a frame; and a plurality of blades rotatably mounted to the frame such that each of the blades is rotatable about a respective rotational axis between an open rotational position and a closed rotational position, wherein for at least one of the blades the angle of rotation between the open rotational position and the closed rotational position is at least 100°, each of the blades comprising:

at least one substantially planar portion; and a side edge portion which is curved away from a plane of the substantially planar portion, wherein a first curved side edge portion of a first of the blades is adapted to engage a second curved side edge portion of a second of the blades, adjacent the first, when the blades are in the closed position; and wherein the first curved side edge portion curves in an opposite direction to the second curved side edge portion when the first and second blades are engaged, wherein the first blade is provided with a resiliently flexible sealing member extending from the substantially planar portion of the first blade, the resiliently flexible sealing member adapted to abut a surface of the second blade when the blades are in the closed rotational position; and wherein the first blade is provided with a bimetallic strip, the bimetallic strip extending from the substantially planar portion of the first blade and configured to bend and overlap both the first and second blades when the first and second blades are in the closed rotational position.

2. A fire damper according to claim 1, wherein in transverse cross section, each of the first and second side edge portions form a curve having a central angle of between 180° and 200°.

3. A fire damper according to claim 2, wherein the curve is an arc.

4. A fire damper according to claim 3, wherein the central angle of the arc is substantially 194°.

5. A fire damper according to claim 3, wherein a ratio of the radius of the arc and a distance between the respective rotational axis of each of the blades and a boundary between the planar portion and the side edge portion is substantially 1:12.

6. A fire damper according to claim 2, wherein each of the curved side edge portions comprises a partial surface of revolution.

7. A fire damper according to claim 6, wherein the axis of rotation of the surface of revolution of each of the blades is parallel to the rotational axis of the respective blade.

8. A fire damper according to claim 1, wherein the sealing member is biased towards a rest position.

9. A fire damper according to claim 8, wherein the sealing member is deflected from the rest position to a sealing position when contacted by the second blade.

10. A fire damper according to claim 9, wherein the sealing member forms a smaller angle with respect to the planar portion of the first blade when in the sealing position than when in the rest position.

11. A fire damper according to claim 1, wherein the sealing member is attached to the first blade near a side edge of the blade.

12. A fire damper according to claim 1, wherein the sealing member is configured to contact the second curved side edge portion of the second blade when the blades are in the closed rotational position.

13. A fire damper according to claim 1, wherein the sealing member is formed from stainless steel.

14. A fire damper according to claim 1, wherein a layer covers the sealing member and is spot welded to the first blade.

15. A fire damper according to claim 1, wherein the angle of rotation is between 100° and 120°.

16. A fire damper according to claim 15, wherein the angle of rotation is 111°.

17. A fire damper according to claim 1, wherein the fire damper comprises a linkage system to convert a 90° rotation of a motor to the desired rotation of the blade.

18. A fire damper according to claim 1, wherein the resiliently flexible sealing member is adapted to abut a radially outer surface of the second curved side edge portion when the blades are in the closed rotational position.

* * * * *